(12) United States Patent
Kong

(10) Patent No.: US 11,119,587 B1
(45) Date of Patent: Sep. 14, 2021

(54) COMPUTER READABLE RECORDING MEDIUM CAN PERFORM IMAGE SENSING SYSTEM CONTROL METHOD AND IMAGE SENSING SYSTEM

(71) Applicant: PixArt Imaging Inc., Hsin-Chu (TW)

(72) Inventor: Shang Chan Kong, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/830,212

(22) Filed: Mar. 25, 2020

(51) Int. Cl.
*G06F 3/0354* (2013.01)
*G06T 7/20* (2017.01)

(52) U.S. Cl.
CPC ............ *G06F 3/03543* (2013.01); *G06T 7/20* (2013.01)

(58) Field of Classification Search
CPC .......... G06T 7/248; G06T 7/74; G06T 7/246; G06T 7/73; G06F 3/0304; G06F 3/03543; G06F 3/03; H04N 5/23254; H04N 5/232; G09G 5/00
See application file for complete search history.

(56) References Cited

U.S. PATENT DOCUMENTS

| | | | |
|---|---|---|---|
| 9,749,524 B1* | 8/2017 | Doepke | H04N 5/23261 |
| 10,819,896 B1* | 10/2020 | Tan | H04N 5/232 |
| 2011/0150287 A1* | 6/2011 | Flosdorf | G06T 7/246 382/107 |
| 2014/0368688 A1* | 12/2014 | John Archibald | G06K 9/00993 348/222.1 |
| 2015/0301618 A1* | 10/2015 | Tan | G06F 3/03543 345/166 |
| 2015/0334315 A1* | 11/2015 | Teich | G06T 5/20 348/164 |
| 2020/0366823 A1* | 11/2020 | Tan | G06T 7/20 |

\* cited by examiner

*Primary Examiner* — Vinh T Lam
(74) *Attorney, Agent, or Firm* — Winston Hsu

(57) ABSTRACT

An image sensing system control method, comprising: (a) predicting a first velocity of the image sensor; (b) calculating a first time duration between a first frame time and a first polling time after the first frame time, wherein the image sensor captures a first frame at the first frame time and receives a first polling from the control circuit at the first polling time; and (c) calculating a first predicted motion delta of the first time duration according to the first velocity and the first time duration.

22 Claims, 7 Drawing Sheets

COMPUTER READABLE RECORDING MEDIUM CAN PERFORM IMAGE SENSING SYSTEM CONTROL METHOD AND IMAGE SENSING SYSTEM

BACKGROUND OF THE INVENTION

1. Field of the Invention

The present invention relates to an image sensing system control method and an image sensing system, and particularly relates to an image sensing system control method and an image sensing system which can reduce the effect caused by non-synchronization between the frame rate and the MCU polling.

2. Description of the Prior Art

In an optical navigation device such as an optical mouse, the image sensor thereof captures frames at a predetermined frame rate and then computes the motion delta between different frames. Such predetermined frame rate may change corresponding to different modes, for example, an active mode or a standby mode. Also, a MCU (micro control unit) polls the image sensor for motion delta (i.e. request the image sensor to output motion delta). However, the MCU polling rate and the image sensor frame rate are usually different and non-synchronized with each other. As a result, motion delta output and MCU polling will never be consistent.

FIG. 1 is a schematic diagram illustrating the non-synchronization between the frame rate and the MCU polling in prior art. As illustrated in FIG. 1, frames f_1, f_2 ... f_8 are captured by an image sensor, and motion delta D_1, D_2 ... between different frames are respectively computed by the image sensor. Also, a MCU coupled to the image sensor generates pollings P_1-P_3 to request motion delta.

For more details, the image sensor outputs motion deltas D_1, D_2 to the MCU responding to the polling P_1, outputs motion deltas D_3, D_4, D_5 to the MCU responding to the polling P_2, and outputs motion deltas D_6, D_7 to the MCU responding to the polling P_3. However, due to the non-synchronization, the pollings P_1, P_2, P_3 respectively has different latencies L_1, L_2, L_3 from the frames f_3, f_6, and f_8. Also, due to the non-synchronization, the MCU may receive different numbers of motion deltas responding to different pollings. For example, the MCU receives two motion deltas D_1, D_2 for the polling P1, but receives three motion deltas D_3, D_4, D_5 for the polling P2. Since the motion deltas are always applied to compute a position of the optical pointing device, the issues illustrated in FIG. 1 may affect the accuracy of position computing.

SUMMARY OF THE INVENTION

Therefore, one objective of the present invention is to provide an image sensing system control method can reduce the affect caused by non-synchronization between the frame rate and the polling.

Another objective of the present invention is to provide an image sensing system control method can reduce the affect caused by non-synchronization between the frame rate and the polling.

One embodiment of the present invention discloses: an image sensing system control method, comprising: (a) predicting a first velocity of the image sensor; (b) calculating a first time duration between a first frame time and a first polling time after the first frame time, wherein the image sensor captures a first frame at the first frame time and receives a first polling from the control circuit at the first polling time; and (c) calculating a first predicted motion delta of the first time duration according to the first velocity and the first time duration.

Another embodiment of the present invention discloses: an image sensing system, comprising: a control circuit; an image sensor, configured to perform: (a) predicting a first velocity of the image sensor; (b) calculating a first time duration between a first frame time and a first polling time after the first frame time, wherein the image sensor captures a first frame at the first frame time and receives a first polling from the control circuit at the first polling time; and (c) calculating a first predicted motion delta of the first time duration according to the first velocity and the first time duration.

In view of above-mentioned embodiments, the motion delta can be output corresponding to the time difference between a time of the frame and a time of the polling, thus can reduce the affect caused by non-synchronization between the frame rate and the polling.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 2:
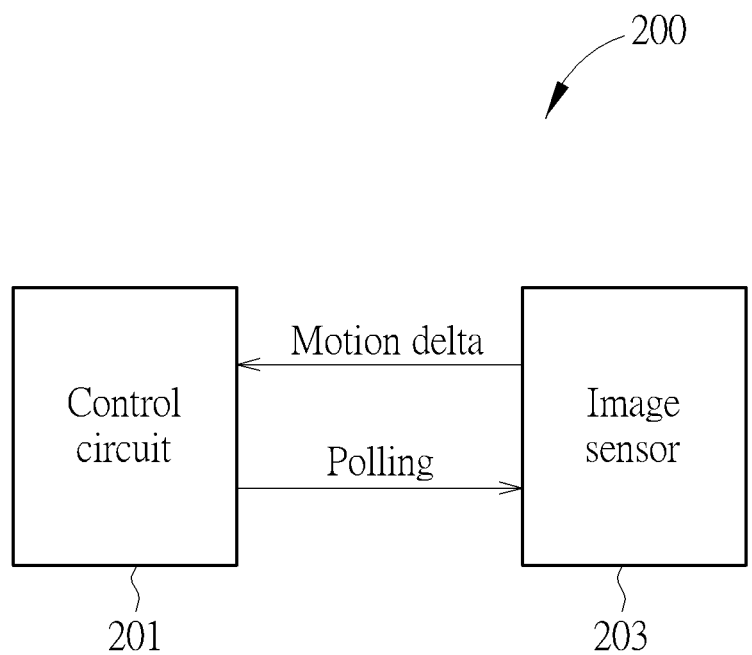
FIG. 2 is a block diagram illustrating an image sensing system according to one embodiment of the present invention.

FIG. 2 is a block diagram illustrating an image sensing system 200 according to one embodiment of the present invention. As illustrated in FIG. 2, the image sensing system 200 comprises a control circuit 201 and an image sensor

203. The control circuit 201 can be above-mentioned MCU or any other device which can perform the same function, such as a processor. The image sensor 203 is configured to capture a plurality of frames and to compute motion deltas between different frames. The control circuit 201 generates pollings to the image sensor 203, and the image sensor 203 outputs motions deltas responding to the pollings. It will be appreciated that the control circuit 201 and the image sensor 203 can be provided in the same electronic device (e.g. an optical pointing device), but also can be provided in different electronic devices as well. Additionally, the image sensor 203 mentioned here is configured to capture a plurality of frames and to compute motion deltas between different frames, thus can also be named as a motion sensor. However, the image sensor 203 can only be configured to capture a plurality of frames, and other computations can be performed by other circuits independent from the image sensor 203.

In following embodiments, at least one velocity of the image sensor (or at least one velocity of an electronic device comprising the image sensor) is predicted. After that, at least one predicted motion delta is calculated according to the predicted velocity, and an output motion delta, which is output to the control circuit, is calculated based on the predicted motion delta. Many methods can be applied to predict the velocity, and will be detailedly illustrated in following descriptions.

Figure 3:
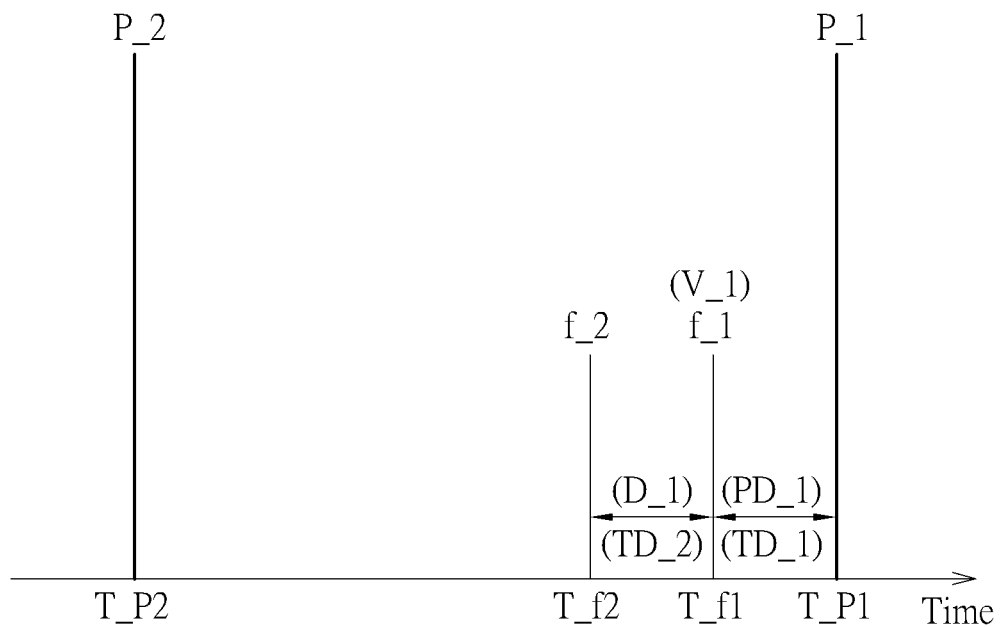
FIG. 3-FIG. 7 are schematic diagrams illustrating image sensing system control methods according to different embodiments of the present invention.
Figure 4:
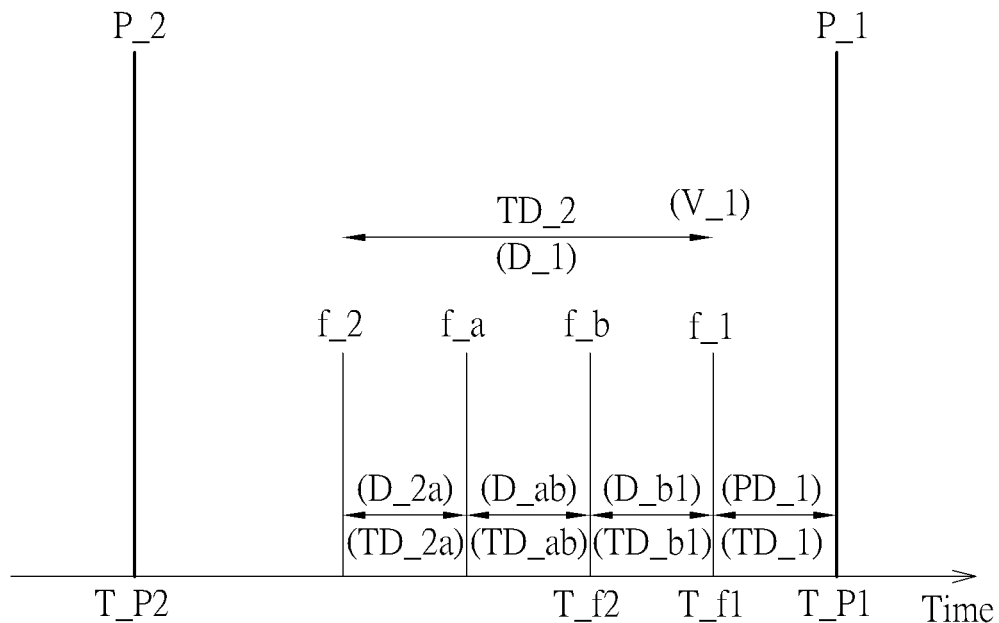

FIG. 3-FIG. 6 are schematic diagrams illustrating image sensing system control methods according to different embodiments of the present invention. In the embodiments of FIG. 3 and FIG. 4, the velocity is predicted according to real time motion delta. Also, in the embodiments of FIG. 5 and FIG. 6, the velocity is predicted according to the polling period and the accumulated motion delta corresponding to at least one polling.

Please refer to FIG. 3, the image sensor 203 captures a first frame f_1 at the first frame time T_f1 and receives a first polling P_1 from the control circuit 201 at the first polling time T_P1. Further, the image sensor 203 captures a second frame f_2 at the second frame time T_f2 and receives a second polling P_2 from the control circuit 201 at the second polling time T_P2. The images sensor 203 calculates a first time duration TD_1 between the first frame time T_f1 and the first polling time T_P1 after the first frame time T_f1. Further, the image sensor 203 calculates a second time duration TD 2 between the first frame time T_f1 and the second frame time T_f2 before the first frame time T_f1. After that, the image sensor 203 predicts a first velocity V_1 of the image sensor 203 or the electronic device comprising the image sensor 203, according to a first motion delta D_1 between the first frame f_1 and the second frame f_2, and according to the second time duration TD 2. Next, the image sensor 203 calculates a first predicted motion delta PD_1 of the first time duration TD_1 according to the first velocity V_1 and the first time duration TD_1. In one embodiment, the image sensor 203 predicts the first velocity according to an equation of $$\frac{D\_1}{T\_f1 - T\_f2}.$$

D_1 indicates the first motion delta, T_f1 indicates the first frame time and T_f2 indicates the second frame time. In such case, the first velocity equals to $$\left(\frac{D\_1}{T\_f1 - T\_f2}\right) \times (TD\_1).$$

In the embodiment of FIG. 3, the first frame time T_f1 and the second frame time T_f2 are before the first polling time T_P1 and after the second polling time T_P2. That is, the image sensor 203 uses frames located between two continuous pollings to predict the first velocity V_1. Further, the image sensor 203 does not capture any frame in the second time duration TD_2. In other words, no frame exists in the time duration between the two frames which the image sensor 203 uses to predict the first velocity V_1.

However, in one embodiment, at least one frame exists in the time duration between the two frames which the image sensor 203 uses to predict the first velocity. Please refer to FIG. 4, in such embodiment, frames f_a, f_b are captured by the image sensor 203 in the second time duration TD_2. However, the image sensor 203 can still predict the first velocity based on the above-mentioned equation of $$\frac{D\_1}{T\_f1 - T\_f2}.$$

D_1 indicates the first motion delta, T_f1 indicates the first frame time and T_f2 indicates the second frame time. Namely, the image sensor 203 predicts the first velocity V_1 based on the equation of $$\frac{D\_2a + D\_ab + D\_b1}{TD\_2a + TD\_ab + TD\_b1}.$$

D_2a, D_ab and D_b1 respectively mean the motion delta between the second frame f_2/frame a, frame f_a/frame f_b and frame f_b/first frame f_1. Also, TD_2a, TD_ab and TD_b1 respectively mean the time durations between the second frame f_2/frame a, frame f_a/frame f_b and frame f_b/first frame f_1.

Figure 1:
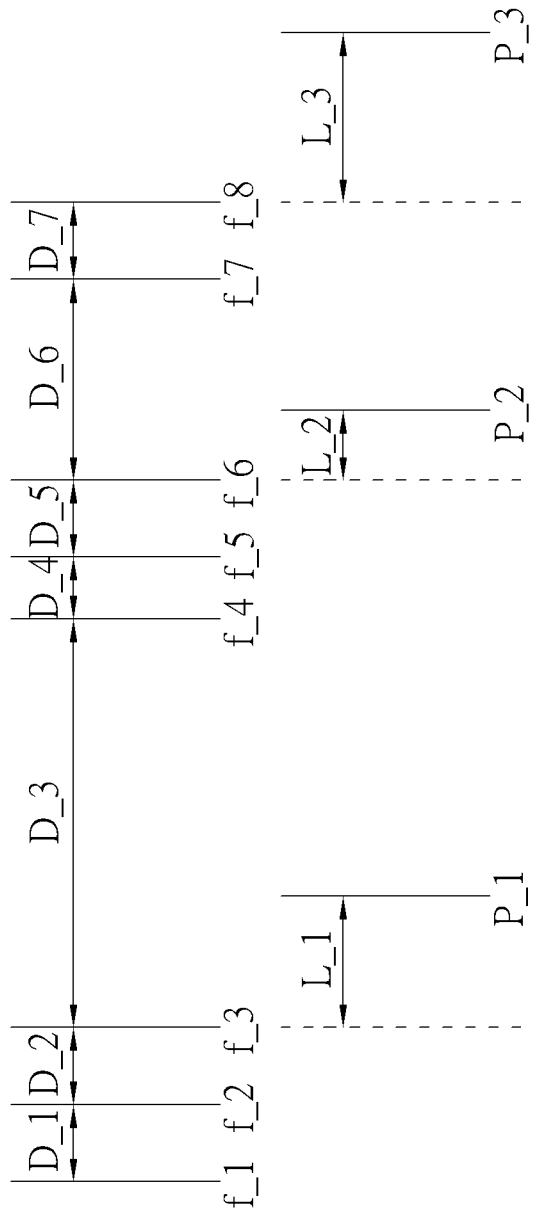
FIG. 1 is a schematic diagram illustrating the non-synchronization between the frame rate and the MCU polling in prior art.
Figure 5:
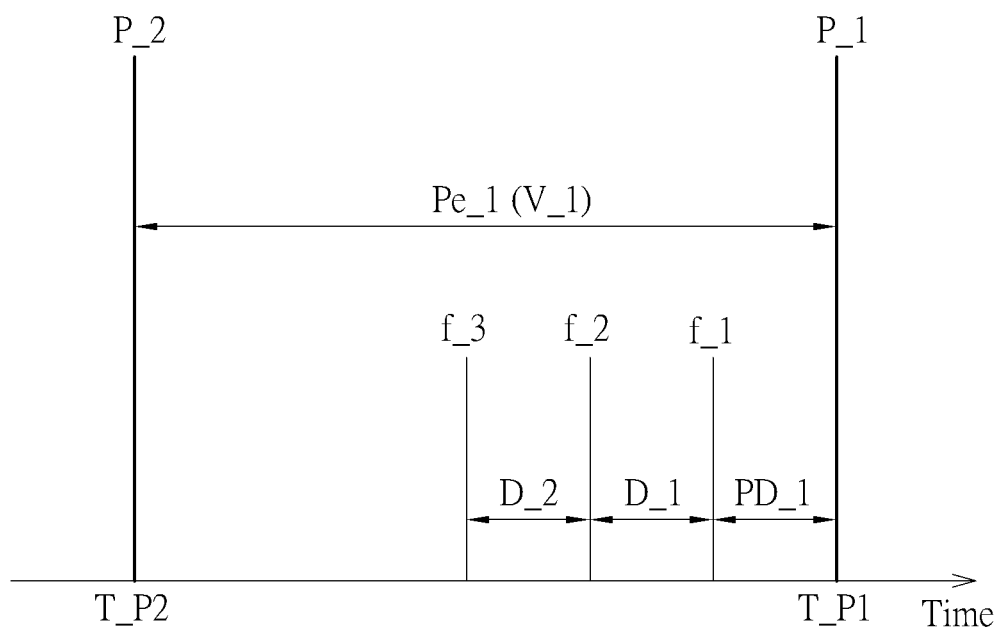
Figure 6:
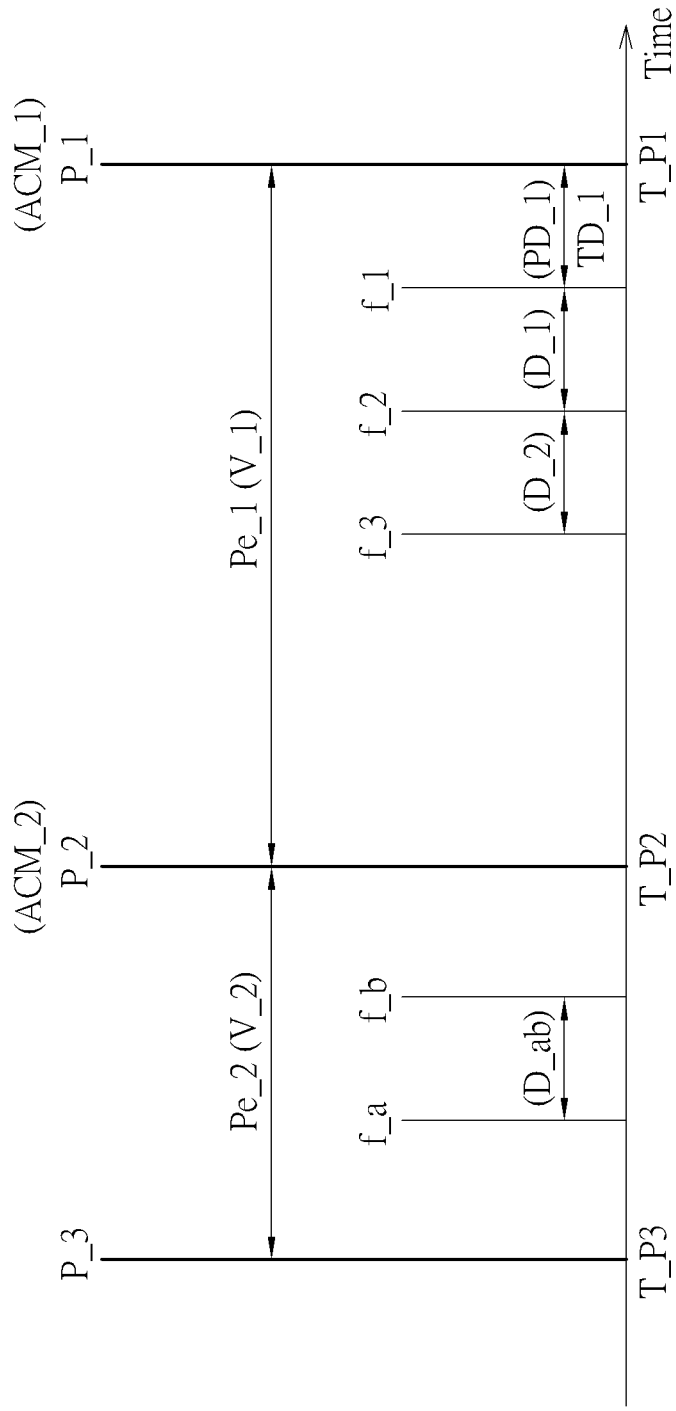

As above-mentioned, the first velocity V_1 can be predicted by various methods. In the embodiments of FIG. 5 and FIG. 6, the first velocity V_1 is predicted according to the polling period and the accumulated motion delta corresponding to at least one polling. In the embodiment of FIG. 5, the image sensor 203 calculates a first polling period Pe_1 between the first polling time T_P1 and the second polling time T_P2. Also, the image sensor 203 calculates a first accumulated motion delta ACM_1 of the first polling T_P1. In one embodiment, the image sensor 203 uses a conventional motion delta calculating method to calculates the first accumulated motion delta ACM_1, which is illustrated in FIG. 1. For example, in the embodiment of FIG. 5, a first frame f_1, a second frame f_2 and a third frame f_3 exists between the first polling time T_P1 and the second polling time T_P2. Also, the motion delta between the first frame f_1 and the second frame f_2 is motion delta D_1, and the motion delta between the second frame f_2 and the third frame f_3 is motion delta D_2. Therefore, in the embodiment of FIG. 5, the first accumulated motion delta ACM_1 is motion delta D_1+ motion delta D_2. Please note, the embodiments illustrated in FIG. 3 and FIG. 4 can be combined to the embodiment of FIG. 5. In such case, the first predicted motion delta PD_1 is also calculated, and the first accumulated motion delta ACM_1 is motion delta D_1+ motion delta D_2+ first predicted motion delta PD_1. In such case, the first predicted motion delta PD_1 can be predicted twice by different methods (the method in FIGS. 3-4, and the method in FIG. 5-6).

After the first accumulated motion delta ACM_1 is acquired, the image sensor 203 predicts the first velocity V_1 according to the first accumulated motion delta ACM_1 and the first polling period Pe_1. In one embodiment, the image sensor 203 predicts the first velocity V_1 according to an equation of $$\frac{ACM\_1}{Pe\_1}.$$

ACM_1 indicates the first accumulated motion delta, and Pe_1 indicates the first polling period. After that, the image sensor 203 calculates the first predicted motion delta PD_1 by V_1×TD_1. TD_1 is the above-mentioned first time duration.

The embodiment illustrated in FIG. 5 is not limited to user only one accumulated motion delta and only one polling period. Please refer to FIG. 6, the image sensor 203 receives a third polling P_3 at a third polling time T_P3 before the second polling time T_P2. Also, the image sensor 203 captures frames f_a, f_b between the second polling time T_P2 and the third polling time T_P3. Therefore, the second accumulated motion delta ACM_2 of the second polling P_2 is the motion delta D_ab between the frame f_a and the frame f_b. The image sensor 203 predicts a second velocity V_2 according to the second accumulated motion delta ACM_2 and the second polling period Pe_2 (e.g.

$$\frac{ACM\_1}{Pe\_1}).$$

After the second velocity V_2 is predicted, the image sensor 203 performs a weighting equation to the first velocity V_1 and the second velocity V_2 to generate a weighting result. Then, the image sensor 203 predicts the velocity of the image sensor 203 or the electronic device comprising the image sensor 203 according to the weighting result. In one embodiment, the image sensor 203 calculates an average of the first velocity V_1 and the second velocity V_2 as the weighting result. It will be appreciated that although the embodiment in FIG. 6 uses two polling periods and two accumulated motion deltas to predict the velocity. However, more than two polling periods and more than two accumulated motion deltas can be used to predict the velocity.

Figure 7:
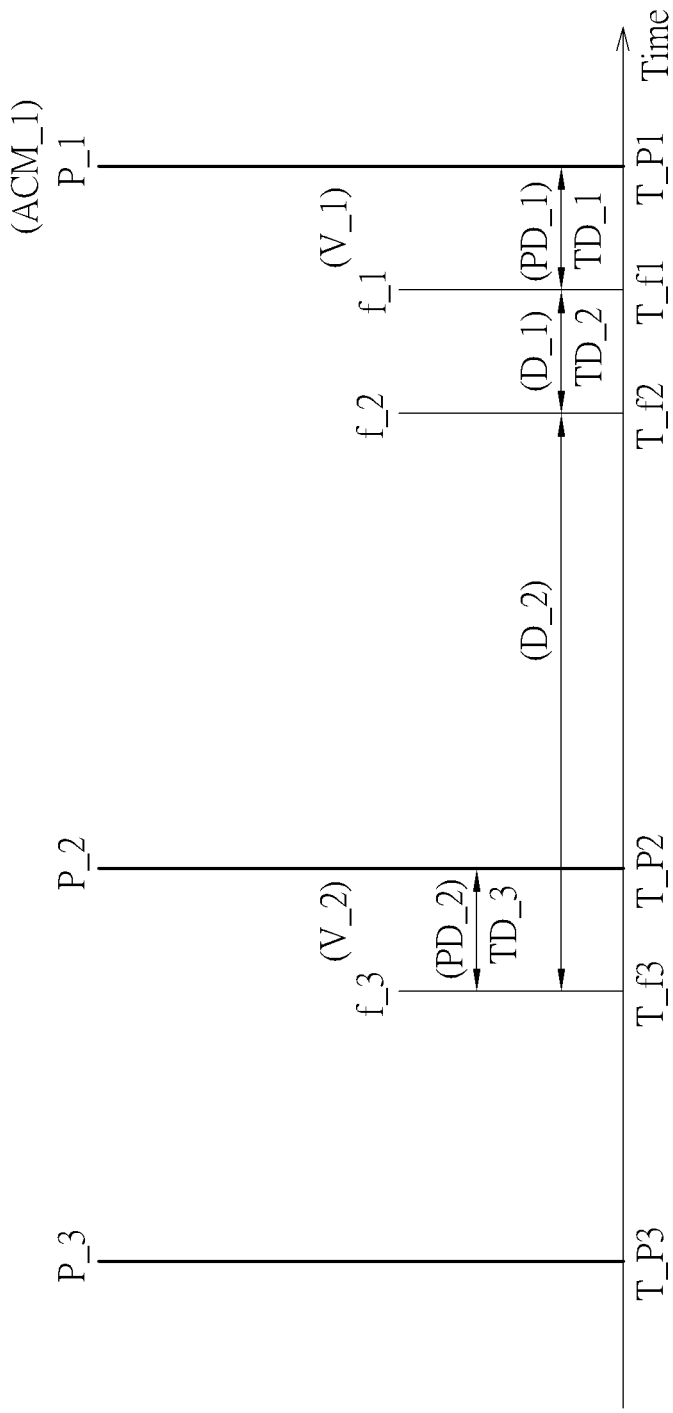

FIG. 7 is a schematic diagram illustrating how the image sensor 203 reports an output motion delta responding to a polling after at least one velocity is predicted. In the embodiment of FIG. 7, the image sensor respectively receives a first polling P_1, a second polling P_2, and a third polling P_3 at the first polling time T_P1, the second polling time T_P2, and the third polling time T_P3. Further, the image sensor 203 respectively captures a first frame f_1, a second frame f_2 and a third frame f_3 at the first frame time T_f1, the second frame time T_f2, and the third frame time T_f3. Also, the first velocity V_1 and the second velocity V_2 are predicted via above-mentioned methods, thus the first predicted motion delta PD_1 and the second predicted motion delta PD_2 can be acquired.

Afterwards, the image sensor 203 reports an output motion delta responding to the first polling P_1 according to a first accumulated motion delta ACM_1 corresponding to the first polling, the first predicted motion delta PD_1 and the second predicted motion delta PD_2. In such case, the first accumulated motion delta ACM_1 can be the motion delta D_1 between the first frame f_1 and the motion delta D_2 between the first frame f_2. Also, in one embodiment, the output motion delta is ACM 1+PD_1-PD_2.

Figure 8:
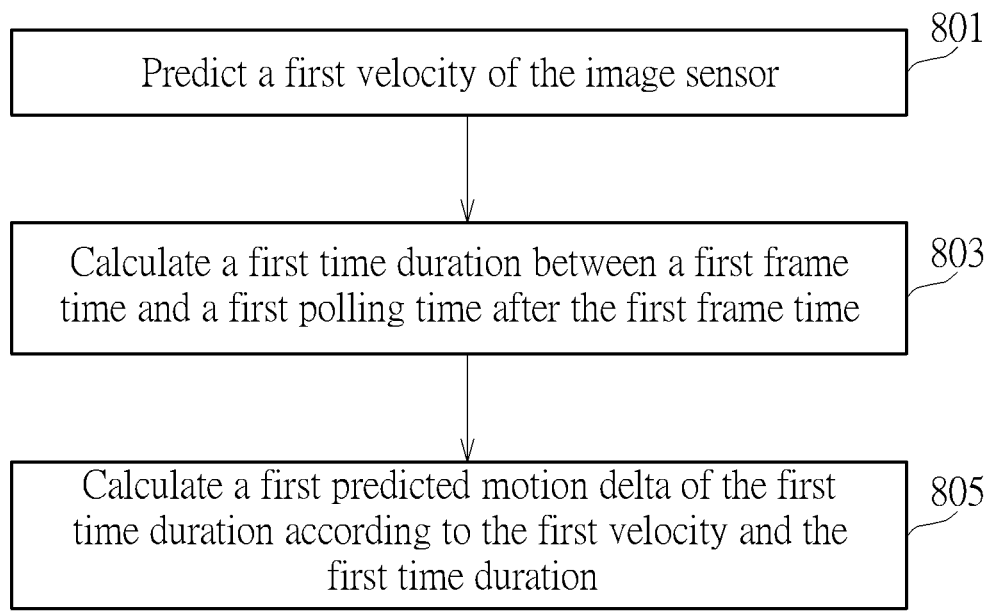
FIG. 8 is a flow chart illustrating an image sensing system control method according to one embodiment of the present invention.

In view of above-mentioned embodiments, an image sensing system control method can be acquired, which can be performed by at least one program recorded in a non-transitory computer readable recording medium such as an optical disc, a hard disk or a memory card. FIG. 8 is a flow chart illustrating an image sensing system control method according to one embodiment of the present invention, which comprises following steps:

Step 801

Predict a first velocity (e.g. V_1 in FIG. 3-FIG. 6) of the image sensor (e.g. 203 in FIG. 2).

Step 803

Calculate a first time duration (e.g. TD_1 in FIG. 1) between a first frame time (e.g. T_f1 in FIG. 1) and a first polling time (e.g. T_P1 in FIG. 1) after the first frame time T_f1.

Step 805

Calculate a first predicted motion delta PD_1 of the first time duration according to the first velocity and the first time duration.

Other detail are explained in above-mentioned embodiments, thus are omitted for brevity here. Please note, the above-mentioned embodiments are only examples for explaining. The combination or variations based on above-mentioned teachings should also fall in the scope of the present invention.

Figure 9:
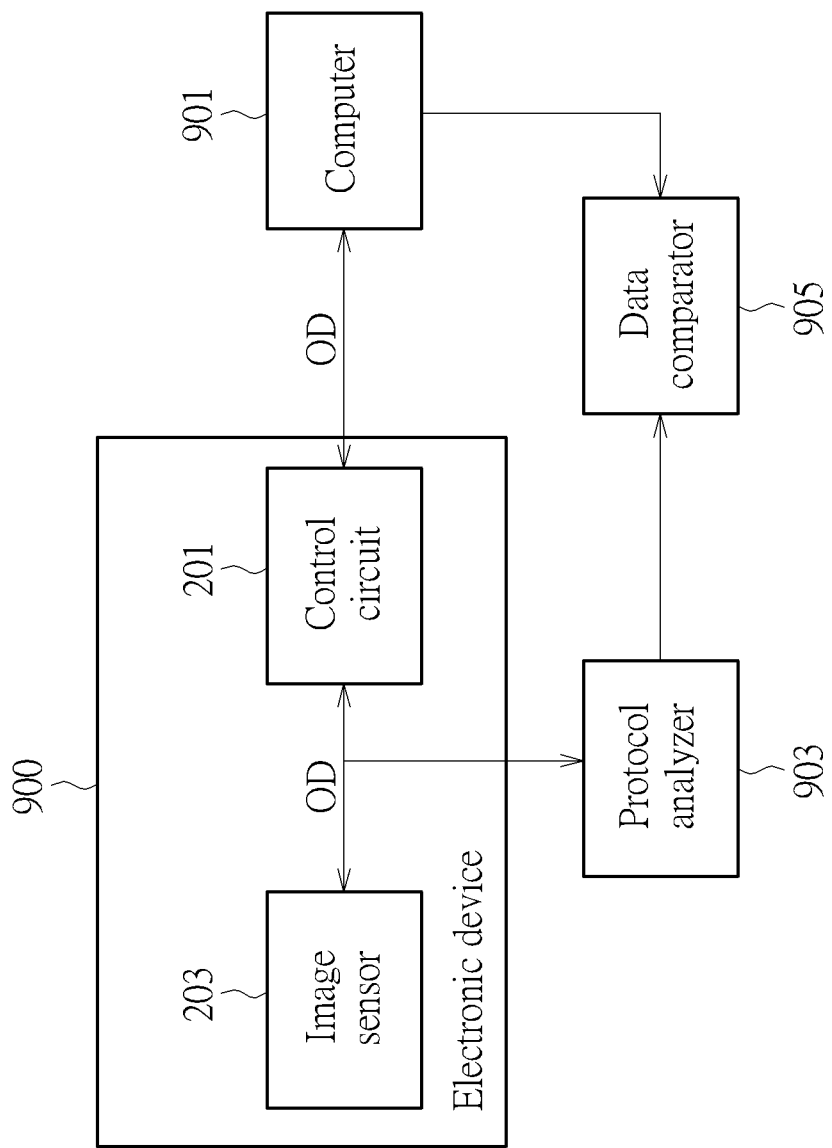
FIG. 9 is a block diagram illustrating an application that the image sensing system provided by the present invention is applied to a computer.

FIG. 9 is a block diagram illustrating an application that the image sensing system provided by the present invention is applied to a computer. In the embodiment of FIG. 9, the control circuit 201 and the image sensor 203 are provided in an electronic device 900. The electronic device 900 can be any kind of device which can communicate with the computer 901. For example, the electronic device 900 can be an optical navigation device such as an optical mouse, or an optical pointing device. As above-mentioned, the control circuit 201 can poll the image sensor 203 to output the above-mentioned output motion delta OD. After receiving the output motion delta OD, the control circuit 201 may transmit the output motion delta OD to the computer 901. Please note, the computer 901 can be replaced by any other electronic device.

Therefore, if it needs to confirm whether the computer 901 correctly receives the output motion delta OD or not, a protocol analyzer 903 can be used to capture the communication between the control circuit 201 and the image sensor 203. After that, extract the output motion delta OD (source) from the log file generated by the protocol analyzer 903. Also, capture the output motion delta OD (destination) at the computer 901, and compare the output motion delta OD (source) and the output motion delta OD (destination) by the data comparator 905. If the control circuit 201 does not change the output motion delta OD from the image sensor 203, the output motion delta OD (source) are the same. The protocol analyzer 903 can be implemented by a circuit specifically designed for capturing the output motion delta OD (source). Also, the protocol analyzer 903 can be a processor installed with at least one program to capture the output motion delta OD (source).

In view of above-mentioned embodiments, the motion delta can be output corresponding to the time difference between a time of the frame and a time of the polling, thus can reduce the affect caused by non-synchronization between the frame rate and the polling.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A non-transitory computer readable recording medium comprising at least one program code recorded therein, an image sensing system control method applied to the image sensing system comprising an image sensor and a control circuit can be performed when the program code is executed, the image sensing system control method comprising:
   (a) predicting a first velocity of the image sensor;
   (b) calculating a first time duration between a first frame time and a first polling time after the first frame time, wherein the image sensor captures a first frame at the first frame time and receives a first polling from the control circuit at the first polling time; and
   (c) calculating a first predicted motion delta of the first time duration according to the first velocity and the first time duration.

2. The non-transitory computer readable recording medium of claim 1, wherein the step (a) comprises following steps to predict the first velocity:
   (a1) calculating a second time duration between the first frame time and a second frame time before the first frame time, wherein the image sensor captures a second frame at the second frame time; and
   (a2) predicting the first velocity according to a first motion delta corresponding to the first frame and the second frame, and according to the second time duration.

3. The non-transitory computer readable recording medium of claim 2, wherein the step (a2) predicts the first velocity according to an equation of $$\frac{D\_1}{T\_f1 - T\_f2},$$

wherein D_1 indicates the first motion delta, T_f1 indicates the first frame time and T_f2 indicates the second frame time.

4. The non-transitory computer readable recording medium of claim 2, wherein the image sensor does not capture any frame in the second time duration.

5. The non-transitory computer readable recording medium of claim 2, wherein the image sensor receives a second polling at a second polling time before the first polling time, wherein the first frame time and the second frame time are before the first polling time and after the second polling time.

6. The non-transitory computer readable recording medium of claim 1, wherein the image sensor receives a second polling at a second polling time before the first polling time, wherein the step (a) comprises following steps to predict the first velocity:
   (a1) calculating a first polling period between the first polling time and the second polling time;
   (a2) calculating a first accumulated motion delta of the first polling; and
   (a3) predicting the first velocity according to the first accumulated motion delta and the first polling period.

7. The non-transitory computer readable recording medium of claim 6, wherein the step (a3) predicts the first velocity according to an equation of $$\frac{ACM\_1}{Pe\_1},$$

wherein ACM_1 indicates the first accumulated motion delta, and Pe_1 indicates the first polling period.

8. The non-transitory computer readable recording medium of claim 6, wherein the image sensor receives a third polling at a third polling time before the second polling time, wherein the image sensing system control method further comprises:
   calculating a second polling period between the second polling time and the third polling time;
   calculating a second accumulated motion delta of the second polling; and
   predicting a second velocity according to the second accumulated motion delta and the second polling period;
   wherein the step (c) calculates the first predicted motion delta according to the first velocity, the second velocity and the first time duration.

9. The non-transitory computer readable recording medium of claim 8, further comprising:
   performing a weighting equation to the first velocity and the second velocity to generate a weighting result;
   wherein the step (c) calculates the first predicted motion delta according to the weighting result and the first time duration.

10. The non-transitory computer readable recording medium of claim 1, further comprising:
    predicting a second velocity of the image sensor;
    calculating a third time duration between a third frame time and a second polling time after the third frame time, wherein the image sensor captures a third frame at the third frame time, wherein the image sensor receives a third polling from the control circuit at the third polling time, wherein the third frame time and the second polling time are before the first frame time and the first polling time; and
    calculating a second predicted motion delta of the third time duration according to the second velocity and the third time duration;
    wherein the image sensor reports an output motion delta responding to the first polling according to a first accumulated motion delta corresponding to the first polling, the first predicted motion delta and the second predicted motion delta.

11. The non-transitory computer readable recording medium of claim 10,
    wherein the image sensor reports the output motion delta via an equation of: ACM_1+PD_1-PD_2, wherein ACM_1 indicates the first accumulated motion delta, PD_1 indicates the first predicted motion delta, and PD_2 indicates the second predicted motion delta.

12. An image sensing system, comprising:
a control circuit;
an image sensor, configured to perform:
(a) predicting a first velocity of the image sensor;
(b) calculating a first time duration between a first frame time and a first polling time after the first frame time, wherein the image sensor captures a first frame at the first frame time and receives a first polling from the control circuit at the first polling time; and
(c) calculating a first predicted motion delta of the first time duration according to the first velocity and the first time duration.

13. The image sensing system of claim 12, wherein the step (a) comprises following steps to predict the first velocity:
(a1) calculating a second time duration between the first frame time and a second frame time before the first frame time, wherein the image sensor captures a second frame at the second frame time; and
(a2) predicting the first velocity according to a first motion delta corresponding to the first frame and the second frame, and according to the second time duration.

14. The image sensing system of claim 13, wherein the step (a2) predicts the first velocity according to an equation of $$\frac{D\_1}{T\_f1 - T\_f2},$$

wherein D_1 indicates the first motion delta, T_f1 indicates the first frame time and T_f2 indicates the second frame time.

15. The image sensing system of claim 13, wherein the image sensor does not capture any frame in the second time duration.

16. The image sensing system of claim 13, wherein the image sensor receives a second polling at a second polling time before the first polling time, wherein the first frame time and the second frame time are before the first polling time and after the second polling time.

17. The image sensing system of claim 12, wherein the image sensor receives a second polling at a second polling time before the first polling time, wherein the step (a) comprises following steps to predict the first velocity:
(a1) calculating a first polling period between the first polling time and the second polling time;
(a2) calculating a first accumulated motion delta of the first polling; and
(a3) predicting the first velocity according to the first accumulated motion delta and the first polling period.

18. The image sensing system of claim 17, wherein the step (a3) predicts $$\frac{ACM\_1}{Pe\_1},$$

the first velocity according to an equation of wherein ACM_1 indicates the first accumulated motion delta, and Pe_1 indicates the first polling period.

19. The image sensing system of claim 17, wherein the image sensor receives a third polling at a third polling time before the second polling time, wherein the image sensor further performs:
calculating a second polling period between the second polling time and the third polling time;
calculating a second accumulated motion delta of the second polling; and
predicting a second velocity according to the second accumulated motion delta and the second polling period;
wherein the step (c) calculates the first predicted motion delta according to the first velocity, the second velocity and the first time duration.

20. The image sensing system of claim 19, wherein the image sensor further performs:
performing a weighting equation to the first velocity and the second velocity to generate a weighting result;
wherein the step (c) calculates the first predicted motion delta according to the weighting result and the first time duration.

21. The image sensing system of claim 12, wherein the image sensor further performs:
predicting a second velocity of the image sensor;
calculating a third time duration between a third frame time and a second polling time after the third frame time, wherein the image sensor captures a third frame at the third frame time, wherein the image sensor receives a third polling from the control circuit at the third polling time, wherein the third frame time and the second polling time are before the first frame time and the first polling time; and
calculating a second predicted motion delta of the third time duration according to the second velocity and the third time duration;
wherein the image sensor reports an output motion delta responding to the first polling according to a first accumulated motion delta corresponding to the first polling, the first predicted motion delta and the second predicted motion delta.

22. The image sensing system of claim 21, wherein the image sensor reports the output motion delta via an equation of: ACM_1+PD_1-PD_2, wherein ACM_1 indicates the first accumulated motion delta, PD_1 indicates the first predicted motion delta, and PD_2 indicates the second predicted motion delta.

* * * * *